United States Patent [19]

Boaz

[11] Patent Number: 5,759,220

[45] Date of Patent: Jun. 2, 1998

[54] METHOD TO FABRICATE SHAPED LAMINATED GLASS PANES

[75] Inventor: Premakaran Tucker Boaz, Livonia, Mich.

[73] Assignee: Ford Motor Company, Dearborn, Mich.

[21] Appl. No.: 410,268

[22] Filed: Mar. 24, 1995

[51] Int. Cl.⁶ ................................................... C03B 23/025
[52] U.S. Cl. .................... 65/102; 65/60.5; 65/60.51; 65/60.53; 65/106; 65/107; 65/60.52
[58] Field of Search ........................... 65/60.5, 60.51, 65/60.53, 102, 106, 107, 60.52

[56] References Cited

U.S. PATENT DOCUMENTS

| | | | |
|---|---|---|---|
| 3,001,901 | 9/1961 | Barkley | 150/222 |
| 3,078,693 | 2/1963 | Lytle | 65/60 |
| 4,288,252 | 9/1981 | Neely | 106/74 |
| 4,551,372 | 11/1985 | Kunert | 428/38 |
| 4,596,590 | 6/1986 | Boaz | 65/60.51 |
| 4,644,139 | 2/1987 | Harrison et al. | 219/522 |
| 4,654,067 | 3/1987 | Ramus et al. | 65/60.5 |
| 4,668,270 | 5/1987 | Ramus | 65/106 |
| 4,718,932 | 1/1988 | Pharms | 65/42 |
| 4,744,844 | 5/1988 | Hurst | 156/101 |
| 4,786,784 | 11/1988 | Nikodem et al. | 219/543 |
| 5,108,479 | 4/1992 | Hirano | 65/60.52 |
| 5,120,570 | 6/1992 | Boaz | 65/60.5 |
| 5,203,902 | 4/1993 | Murkens | 65/107 X |
| 5,324,373 | 6/1994 | Gillner et al. | 156/99 |
| 5,324,374 | 6/1994 | Harmand et al. | 156/102 |
| 5,431,966 | 7/1995 | Daude et al. | 427/553 |
| 5,443,669 | 8/1995 | Tünker | 156/102 |
| 5,498,284 | 3/1996 | Neely, Jr. | 106/269 |
| 5,509,964 | 4/1996 | Boaz | 118/58 |
| 5,510,188 | 4/1996 | Vockler | 428/426 |
| 5,518,535 | 5/1996 | Boaz | 106/38.3 |

FOREIGN PATENT DOCUMENTS

| | | |
|---|---|---|
| 0 013 970 | 1/1980 | European Pat. Off. . |
| 0 535 474 | 9/1992 | European Pat. Off. . |
| 0 553 003 | 1/1993 | European Pat. Off. . |
| 43 16 575 | 7/1994 | Germany . |

Primary Examiner—Arlen Soderquist
Attorney, Agent, or Firm—Lorraine S. Melotik

[57] ABSTRACT

This invention is directed to a method for manufacturing shaped laminated glass panes comprising an inner glass sheet, and intermediate layer such as thermoplastic material and an outer glass sheet. The method comprises providing a layer of silicate water-based paint on at least a portion of a glass sheet surface which is to bear against the intermediate layer, drying the paint at moderate temperature to remove water and cure the paint, placing the glass sheets together so that the surfaces which are to bear against the intermediate layer are in proximity with one another and are parallel, bending the glass sheets simultaneously into a final shape at elevated temperature, and cooling the glass sheets.

7 Claims, 1 Drawing Sheet

METHOD TO FABRICATE SHAPED LAMINATED GLASS PANES

FIELD OF THE INVENTION

This invention is directed to a method for manufacturing shaped laminated glass panes which comprise an intermediate layer, such as a thermoplastic film, laminated between two shaped glass sheets. More particularly, at least one of the glass sheets is provided with a water-based silicate paint on a surface which is to bear against the intermediate layer.

BACKGROUND OF THE INVENTION

Laminated glass windows of automotive vehicles, e.g., windshields, often include an opaque border around the peripheral marginal surface of the windows. This obstruction band hides from external view the adhesive or any other securing means which lie behind the periphery of the windshield. These borders are generally ceramic enamel compositions formed from a mixture of metal or metal oxides and glass frit in a suitable organic vehicle.

In some situations, these borders are carried on the surface of the glass which is exposed inside the vehicle when the windshield has been provided on the vehicle. The paint which has been applied onto the unbent glass is fired onto that surface when the glass passes through the sag bending furnace as one of a pair of glass sheets which are sag bent together prior to lamination.

It has been more desirable, from a durability standpoint, to provide these borders on a surface of the glass sheet which will bear against the interlayer in the laminated product. In U.S. Pat. No. 4,644,139 to Harrison et al., a process is disclosed for providing such a border. It involves sag bending the two glass sheets together with the eventual inner surface of the outer glass sheet carrying the opaque band being uppermost during the bending. After allowing the glass sheets to cool, a plastic interlayer is placed over the inner glass sheet and then the outer sheet is placed on the interlayer with the opaque band contacting the interlayer. Finally, the glass sheets are bonded to the interlayer. One disadvantage of that invention is that as the curvature of the shaped glass increases it is less likely that, after switching the glass sheets, they will mate to form a suitable composite windshield. Another conventional process for manufacturing a laminated windshield with a ceramic paint border, as disclosed in U.S. Pat. No. 4,786,784 to Nikodem et al., involves two firing steps, one to melt the paint and fuse it to the glass surface and the second to shape the glass templates. Such processess, because they requires two firings of the glass, increases the likelihood that the glass will have optical distortions. Typically in such a process, a ceramic paint is applied to one of the windshield templates and then dried, to remove the organic constituents, and fired to fuse the paint to the template, with the template in a "flat" condition. After applying a separating agent on the paint, this template is paired with the another windshield template, the painted surface arranged inside the template pair and the pair is fired and bent to the desired final shape. After cooling the templates, they are separated, then the separating agent is washed away, and finally an interlayer like polyvinyl butyral is laminated between the template pair. In such a process, there is an increased risk that with the melting of the paint during glass bending, the glass sheets will stick together. As would be appreciated, firing of the paint and bending of the glass to its final shape has not been carried out in one step because the paint contains organic constituents which form gaseous reaction products at the baking temperature. The gases cannot escape from the space between the two glass templates during the glass bending.

U.S. Pat. No. 5,324,373 to Gillner et al. discloses an improved process for manufacturing such a windshield. It involves painting one of the windshield templates, and then, after drying the paint, pairing the templates with the painted side out. Subsequently, the pair is fired to pre-bend the pair to a partial shape and the fire the paint. The paint is then coated with a separating agent and the template pair reassembled with the painted side in. The reassembled pair is reloaded on a bending fixture and refired to complete the shaping process. The cooled pair is then washed of the separating agent and laminated with an interlayer between. This process is elaborate and again requires a double firing of the glass with the increased likelihood of optical distortion.

The present invention method involves overcomes the deficiencies of the prior art processes described above.

SUMMARY OF THE INVENTION

This invention is a method for fabricating a shaped glass pane of laminated glass, the laminated glass comprising an inner glass sheet, an intermediate layer, and an outer glass sheet. The method comprises the steps of: providing a layer of silicate water-based paint on at least a portion of a glass sheet surface which is to bear against the intermediate layer; drying the paint at a temperature below the softening point of the glass to substantially remove the water present in the paint and cure the paint; placing the outer and inner glass sheets together so that the glass sheet surfaces which are to bear against the intermediate layer are in proximity with one another and are parallel; bending the outer and inner sheets simultaneously into a final shape at an elevated temperature of at least about 550° C.; and cooling the outer and inner glass sheets.

Advantageously, according to the method of this invention laminated shaped glass windows with internal surfaces printed with paint, e.g., an opaque paint border, can be simply produced as for automotive windshields. The invention method allows for manufacturing such windows with less distortions and in a more simple and efficient manner than that of prior-art processes.

DETAILED DESCRIPTION OF PREFERRED EMBODIMENTS

As disclosed above, the present invention fabrication method is used to provide a shaped glass pane of laminated glass such as an automotive windshield or a backlite. This laminated glass comprises an inner glass sheet, an intermediate layer such as a plastic material like polyvinyl butyral, and an outer glass sheet. The laminated glass carries, on at least a portion of a glass sheet surface which is to bear against the intermediate layer, a layer of a water-based silicate paint. Preferably, this paint would be an opaque paint and be provided as a border around the entire perimeter of the glass sheet. The purpose of the opaque area is to prevent viewing from the exterior of the vehicle of locations such as under the instrument panel or above the headliner, such areas otherwise being visible because of the location and manner of installing a windshield in a vehicle. Most modern vehicles have opaque areas thereon. These areas may be individually located, for example at the top and bottom of a windshield or at the sides thereof.

The paint used in this method is a water-based silicate paint. The preferred water based paint of this method includes soluble silicates, e.g., sodium or potassium silicates, as the main ingredient, metal oxides like copper oxide as the colorant, in that instance providing a black color to the paint, and water. A number of water-based silicate paints of this type are commercially available, one being CERAM-VUE™ (Industrial Control Development, Inc. Vancouver, Wash.), which is a black water based silicate paint of this type. Still other water-based silicate paints useful in this invention method will be apparent to those skilled in the art in view of this disclosure. A water-based silicate paint more preferably employed in the present method is disclosed in U.S. Pat. No. 5,518,535 concurrently filed herewith and entitled "Water-Based Paint for Glass Sheets" to Boaz present inventor, which is commonly assigned with this invention. It comprises sodium silicate, water, finely divided metal oxide pigment, and zinc oxide as an adhesion promotor.

In accordance with the disclosure of the present invention, the following is presented as a description of a preferred embodiment of the method of making a shaped laminated pane of glass, like a windshield, having two sheets of glass with an interlayer between and a paint carried on at least a portion of the glass sheets which will bear against the interlayer. While the paint may be carried on a portion of one of the glass sheets, if desired it can be carried on both glass sheets, which will bear against the interlayer. The description is not intended to be a limitation upon the broader principles of this method, and while preferred materials are used to illustrate the method of the present invention, it does not mean that other materials can not be used in the method.

Figure 1:
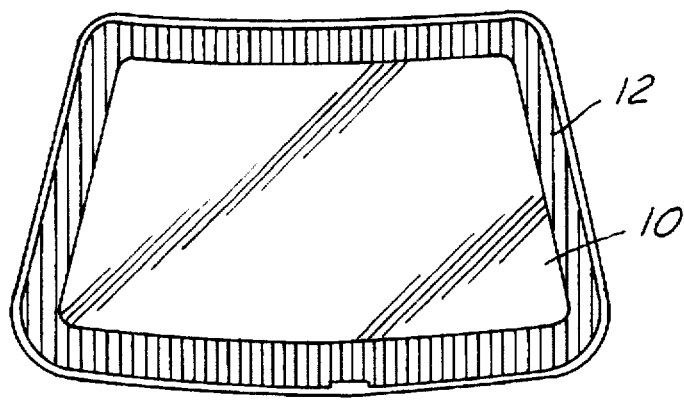
FIG. 1 is a schematic representation of a glass template having an opaque paint place thereon.

A glass template 10 from a sheet of glass as is shown in FIG. 1 is provided with a layer of water-based silicate paint 12 around the peripheral portion. This glass template (or glass sheet) 10 is the template which will face the outside of the automotive vehicle when it is installed in the vehicle. Generally, this outer glass template is of larger size than the glass template which will face the interior of the vehicle (the inner glass template) when the outer and inner glass templates are laminated together by a laminating interlayer. The paint 12 is provided, according to one embodiment, on the surface of the first glass template 10 which will be in contact with the laminating interlayer when the glass template 10 is laminated to another glass template to form a laminated windshield. In the art, the surfaces of template 10 are commonly designated surface #1 and surface #2. Surface #1 is that which will be outermost when the windshield is installed in the vehicle and surface #2 is that which contacts the interlayer. While the paint may be provided on the outer glass template surface #2 as described above, it may alternately or also be provided on the inner glass template on that surface (#3) which contacts the interlayer in the assembled windshield. It is preferred that the paint be provided on the #3 surface. The paint may be applied by any technique, such as rolling, brushing, or screen printing, the latter being preferred.

In order to optimally apply the paint, a humid environment is preferably maintained around the paint. This environment can be maintained, e.g., by means of the invention disclosed in U.S. Pat. No. 5,509,545 and entitled "Apparatus and Method for Applying a Coating to Glass", which invention is commonly assigned with this invention. In several examples of the method of the present invention, wherein the silicate water-based paint employed it within the invention disclosed above as being commonly assigned, the humidity surrounding the paint as it is being applied is preferably maintained at 80+5% RH. It is not however necessary to maintain an humid environment in order to practice the method of this invention. Selection of the optimal environment would be within the skill of one in the art in view of the present disclosure.

The paint is then subjected to elevated temperatures, as by means of an infra red (IR) oven or a microwave oven, to drive off substantially all of the water in the paint and cure the paint. This step is carried at a temperature below the softening point of the glass, the particular temperature not being critical. A moderate temperature is preferably employed, e.g., one below about 400° C., more preferably between about 100° and 200° C. Since water is the only volatile component to be driven off after which the paint forms a cured film, moderate temperatures below the softening point of the glass may be employed. This is in contrast to methods which employ providing conventional organic vehicle based glass paints which require much higher temperature, i.e., above the glass softening temperature, for curing. In one embodiment, when the paint disclosed above is applied to the template in a thickness of about 15 microns, drying of the paint in an IR oven was accomplished in about 1 minute at about 200° F., while it correspondingly took less than about 1 minute in a microwave oven. As related to the time required to dry and cure the paint layer, the thickness of the paint layer is not critical. Optimal parameters for drying and curing the paint layer will be apparent to those skilled in the art in view of the present disclosure.

After the drying step, the paint is bonded to the selected surface of the glass template so that it could not be scratched off the glass if engaged by a tool or other scratching element. The bond is strong enough that the glass template may be handled and moved from one operation to another without damage to the painted opaque areas.

Figure 2:
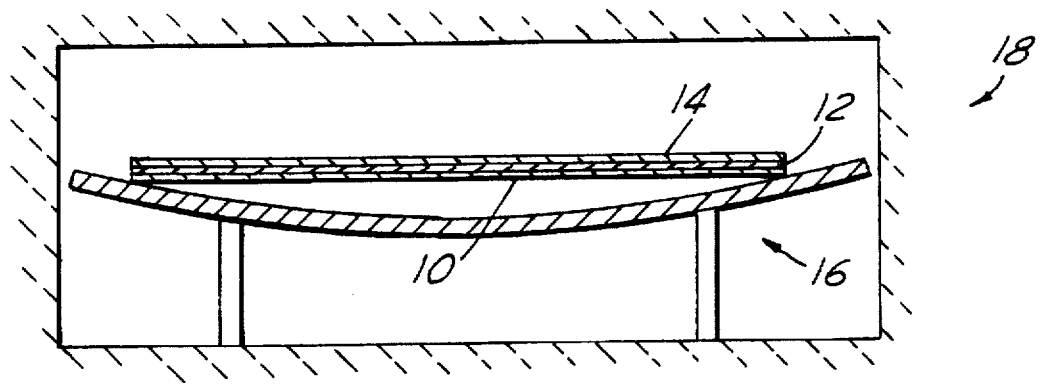
FIG. 2 is a schematic representation, in end view, of two glass templates assembled one over the other prior to a glass bending operation.
Figure 3:
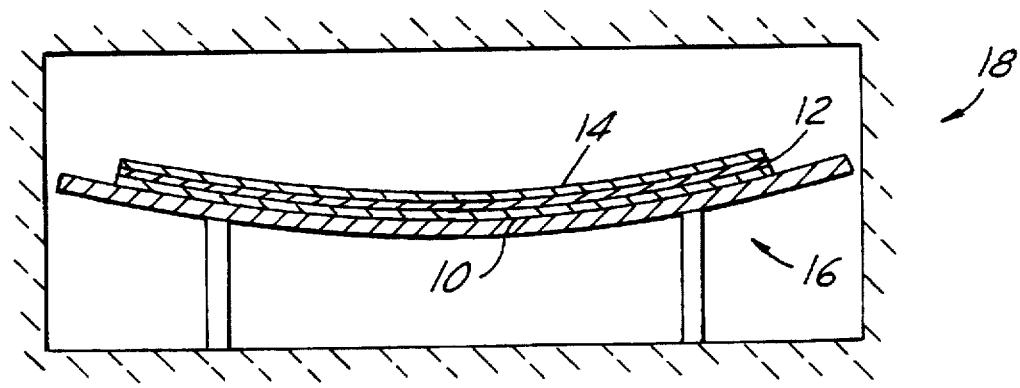
FIG. 3 is a schematic representation of the two glass templates of FIG. 2 after the bending operation has been completed.

Reference is now made to FIG. 2. Next, according to the present method, a second glass template 14 (having surfaces #3 and #4) and the first glass template 10 are placed together, shown only in end-view in FIG. 2 and FIG. 3, so that the glass template surfaces (#2 and #3) which are to bear against the intermediate layer are in proximity with one another and are parallel. The second glass template 14 is generally shorter than first glass template 10. Second glass template 14 will face inside the automotive vehicle when the windshield is installed in the vehicle. More particularly, surface #4 of the inner template of the installed windshield will be innermost to the vehicle interior. Subsequently the outer and inner templates are simultaneously bent into a final shape at an elevated temperature of at least about 550° C., e.g., by any of the available processes for glass bending. Preferably the glass bending temperature is between about 550° C. and 650° C. One commonly used process involves a glass bending fixture 18 of FIGS. 2 and 3. In such a process, bending of the glass template pair may be carried out by placing the pair 10, 14 on a bending fixture 16 as shown in FIGS. 2 and 3. The fixture carrying the template pair would then be placed in a glass bending chamber generally identified by the numeral 18. As is well known in the art, this bending chamber is an elongated chamber through which the glass bending device is moved slowly. As the bending device moves through the chamber, the glass templates 10, 14 are heated to an elevated temperature which causes them to bend or sag into conformity with a shaping surface or the glass bending device as shown in FIG. 3. Thereby the glass sheets are bent to the proper shape for forming a laminated windshield. Their relative position to one another in FIGS. 2 and 3 is the same as in the fabricated windshield.

After the first and second glass templates have been bent, as is shown in FIG. 3, they are cooled down and separated from one another. During the bending operation, the opaque area 12 are fire bonded into the glass surface to become an even more permanent part of the glass surface. The glass templates may also be provided with an electroconductive coating if the window is to be an electrically heated windshield or heating grids as is used in backlites, and connecting clips and so forth. More, particularly, such windows may include printed-on and baked-in heating conductors and an electrically conducting multilayer system applied onto the surface of the outer glass sheet bearing against the intermediate layer. In such a situation, after the cooling step, the sheets would be separated and then an electrically conducting multilayer system applied onto the surface of the outer glass sheet bearing against the intermediate layer.

In order to form the laminated windshield, an interlayer (not shown in the figures) is interposed between the bent glass templates 10, 14. The normal laminating interlayer used is polyvinyl butyral, which is well known in the art. Thereafter, the glass templates are laminated in a standard well-known laminating operation to form a laminated glass windshield.

The following example is presented by way of description of the method of the invention and to set forth a preferred embodiment contemplated by the inventors, but is not to be construed as limiting.

EXAMPLES

This is an example according to an embodiment of the present invention method. As disclosed above, in the art of windshield making the surfaces of the two templates used to make a windshield have been assigned #1 through #4 for their surfaces, progressing from #1 outside the vehicle to #4 inside the vehicle. A long and short template are cut from flat glass sheets. A black silicate paint (sodium silicate, copper oxide pigment, water and zinc oxide) is screen printed on the short templates on surface #3 around the periphery. The paint is dried at about 100° C. using a microwave oven. The microwave oven does not heat the glass. The long and short templates are matched and assembled so that the paint is on the inside of the pair. The pair is loaded on a bending fixture and passed through a lehr and heated to about 575° C. to bend the pair to the desired shape. After the pair is cooled, the templates are separated, washed, and dried.

A layer of polyvinyl butyral is provided between the two templates (surfaces #2 and #3) and the pair with interlayer is autoclaved at an elevated temperature of about 150° C. and pressure of about 275 lbs/in$^2$ to bond the vinyl to the surfaces and form the laminated windshield.

I claim:

1. A method for fabricating a shaped glass pane of laminated glass, said laminated glass comprising an inner glass sheet, and intermediate layer, and an outer glass sheet, the method comprising the steps of:

providing a layer of an essentially organic-solvent-free water-based silicate paint on at least a portion of a glass sheet surface which is to bear against said intermediate layer;

drying said paint at a temperature between about 100° C. to 200° C. to substantially remove the water present in said paint and cure said paint;

placing said outer and inner glass sheets together so that said glass sheet surfaces which are to bear against said intermediate layer are in proximity with one another and parallel;

bending said outer and inner sheets simultaneously into a final shape at an elevated temperature of at least about 550° C.;

cooling said outer and inner glass sheets;

separating said outer and inner glass sheets;

providing an intermediate layer between said outer and inner glass sheets; and laminating said outer and inner glass sheets with said interposed intermediate layer to form said pane of laminated glass.

2. The method according to claim 1, wherein said bending step is carried out using a glass bending fixture.

3. The method according to claim 2, wherein the glass bending fixture has a bending surface which corresponds to the final shape of the surface of the outer glass sheet.

4. The method according to claim 1, wherein the glass pane is an automotive window, and the intermediate layer is a thermoplastic film.

5. The method according to claim 4, wherein said thermoplastic film is polyvinyl butyral.

6. The method according to claim 1, wherein the window is an automotive windshield or and automotive rear window.

7. The method according to claim 1, wherein said drying step involves subjecting said paint to an infra red oven or a microwave oven.

* * * * *